United States Patent Office 2,839,582
Patented June 17, 1958

2,839,582
ETHERS OF CHLORINATED AND FLUORINATED PHENOLS

William L. Howard, Stanley R. McLane, Jr., and Robert L. Weintraub, Frederick, Md.

No Drawing. Application October 29, 1954
Serial No. 465,765

17 Claims. (Cl. 260—612)

(Granted under Title 35, U. S. Code (1952), sec. 266)

The invention described herein may be manufactured and used by or for the Government of the United States of America for governmental purposes without the payment to us of any royalty thereon.

This invention relates to the control of plant growth by long-chain aliphatic ethers of chlorinated and fluorinated phenols. It also relates to certain new compounds in this group.

We have found that certain halogenated phenyl alkyl ethers are effective as plant growth regulators, functioning as herbicides and also in the production of sterility. They may also be employed to prevent premature drop of fruit.

The ethers which we have found to be effective have straight alkyl chains containing even numbers of carbon atoms. They are further characterized as follows:

| Phenolic group: | Aliphatic chain, carbon atoms |
|---|---|
| 4-chlorophenyl | 8 to 18 |
| 2,4-dichlorophenyl | 8 to 18 |
| 2,4,5-trichlorophenyl | 16 |
| 4-fluorophenyl | 12, 14 and 16 |
| 2,4-difluorophenyl | 12, 14 and 16 |
| 2-methyl-4-fluorophenyl | 12, 14 and 16 |

Of these compounds, the group consisting of 4-chlorophenyl myristyl ether, 2,4-dichlorophenyl myristyl ether and 2,4-dichlorophenyl cetyl ether have outstanding activity. 2,4-dichlorophenyl myristyl ether is the most active of all.

In comparison to the well known herbicide 2,4-dichlorophenoxy acetic acid (2,4–D), these compounds possess distinctive properties in that they give a delayed action which is spread over a long period of time, giving a greater over all effect when used in herbicidal quantities. When used in sub-lethal quantities the action, as in production of seedless fruit, is more gradual and produces fewer objectionable side effects. As herbicides, the ethers are applied in the same manner as, but are less active than 2,4–D. Due to their low solubility in water, they are preferably emulsified by the use of suitable emulsifying agents. Since they have densities near that of water they produce stable emulsions. They may also be used as solutions in alcohols, glycol ethers, etc. Other growth regulating properties are illustrated by the following experiments:

EXAMPLE I

Field grown tomato, pepper, squash, and eggplant plants were sprayed with 2,4-dichlorophenyl tetradecyl ether at rates of 0.1 and 0.5 pound per acre. Seedless fruit was produced in each case. The seedless tomatoes were quite firm and were not as puffy as some seedless fruit. Tomato yields were not reduced. The eggplant was normal both in form and in yield. Pepper yields were not reduced but the fruit was flattened and not of normal shape. Squash was of abnormal shape.

EXAMPLE II

Setaria italica was sprayed with 4-chlorphenyl dodecyl ether and 4-chlorophenyl tetradecyl ether at the rate of 1 pound per acre, producing sterility. This suggests the use of these ethers for reducing the amount of seed produced by foxtail and giant foxtail, both of which are Setaria species, as a means of controlling the spread of these weeds.

Of the compounds which we have found to be useful, a considerable number are new and our invention also embraces these new compounds. These novel compounds are the alkyl ethers of 2,4-dichlorophenol having an even number of carbon atoms in a straight alkyl chain containing from eight to eighteen carbon atoms, 2,4,5-trichlorophenyl n-hexadecyl ether, 4-fluorophenyl n-dodecyl ether, 4-fluorophenyl n-tetradecyl ether, 2,4-difluorophenyl n-dodecyl ether, and the n-dodecyl, n-tetradecyl, and n-hexadecyl ethers of 2-methyl-4-fluorophenol. The new ethers are oils or crystalline solids somewhat soluble in many organic solvents such as hydrocarbons, alcohols, ethers, ketones, etc., and practically insoluble in water. They are stable to light, air, and carbon dioxide, and have low volatilities. They are useful in the control of the growth of plants, as described above, and as intermediates in the preparation of more complex organic derivatives.

The compounds may be prepared by reacting (1) at least a molecular proportion of the proper chlorinated or fluorinated phenol as the sodium salt thereof and (2) a molecular proportion of an alkyl halide such as octyl chloride, myristyl bromide, cetyl bromide, etc., or any similar halogenated derivative of an alkane bearing the desired alkyl group carbon atoms. The reaction is carried out in the presence of a solvent such as absolute ethanol. A catalyst such as sodium or potassium iodide may be used to facilitate halogen interchange and increase the yield of the ether by preventing dehydrohalogenation of the alkyl halide to the corresponding alkene.

In the preferred method of preparation, the sodium is dissolved in absolute ethanol and an equivalent amount of the phenol is added to form the sodium phenolate. Potassium iodide is then added and dissolved, followed by an equimolecular amount of the alkyl halide. The mixture is then refluxed for 12 hours or longer. The reaction mixture is diluted with water and the ether separates out. The aqueous-alcoholic layer is extracted with a suitable solvent, the extract combined with the precipitated ether and the resulting solution washed with aqueous alkali to remove unreacted phenol and then with water to remove residual salts and alkali. After drying the extract, the solvent is evaporated, leaving behind a liquid or solid ether which can be purified by distillation at reduced pressure or recrystallized from a suitable medium, as dictated by its physical properties.

As an illustration of the method of preparation, the production of myristyl 2,4-dichlorophenyl ether will be described. As has been previously pointed out, this compound is the most active for our purposes of all of the compounds of our group. The other ethers are prepared in a similar manner.

EXAMPLE III 10.2 grams of 2,4-dichlorophenol was dissolved in 20 milliliters of absolute ethanol. To this was added a solution of 1.4 grams of sodium metal dissolved in 60 milliliters of absolute ethanol. A solution of 9.0 grams of potassium iodide in 120 milliliters of absolute ethanol was added and the mixture refluxed 15 minutes. 20 grams of myristyl bromide was then added and the resulting mixture refluxed 36 hours on a steam bath.

After cooling the reaction mixture it was diluted with 500 milliliters of water, then extracted with 300 milliliters of ethyl ether in 100 milliliter portions. The ether extract was separated and washed with 100 milliliters of 5% sodium hydroxide solution, then 300 milliliters of water, again separated and dried over anhydrous sodium sulfate.

The ethyl ether was removed by distillation leaving behind a solid which was crystallized from any suitable solvent, such as ether or ligroine giving white crystals of 2,4-dichlorophenyl myristyl ether melting at 33–34° C., and having carbon and hydrogen contents of 66.56% and 8.85% respectively. For $C_{20}H_{32}Cl_2O$ the theoretical values are 66.84% and 8.98% respectively.

Representative ethers of our group that have been prepared by the method described above, and the reactants employed, are shown in Table I.

3. n-Octyl 2,4-dichlorophenyl ether.
4. n-Decyl 2,4-dichlorophenyl ether.
5. Lauryl 2,4-dichlorophenyl ether.
6. Myristyl 2,4-dichlorophenyl ether.
7. Cetyl 2,4-dichlorophenyl ether.
8. Cetyl 2,4,5-trichlorophenyl ether.
9. Lauryl 4-fluorophenyl ether.
10. Myristyl 4-fluorophenyl ether.
11. Cetyl 4-fluorophenyl ether.
12. Lauryl 2,4-difluorophenyl ether.
13. Myristyl 2,4-difluorophenyl ether.
14. Cetyl 2,4-difluorophenyl ether.
15. Lauryl 2-methyl-4-fluorophenyl ether.
16. Myristyl 2-methyl-4-fluorophenyl ether.
17. Cetyl 2-methyl-4-fluorophenyl ether.

Table 1

| Reactants | | Ether Product | Melting Point, °C. | Boiling Point | | $[n]_D^{25°C.}$ | Density 25° C. |
| --- | --- | --- | --- | --- | --- | --- | --- |
| Alkyl Halide | Phenol | | | Temp., °C. | Pressure, mm. Hg abs. | | |
| n octyl bromide | 2,4 dichlorophenol | n octyl 2,4 dichlorophenyl ether | | 164 | 2 | 1.5121 | 1.090 |
| n decyl bromide | do | n decyl 2,4 dichlorophenyl ether | | 174 | 2 | 1.5080 | 1.061 |
| lauryl bromide | do | lauryl 2,4 dichlorophenyl ether | | 197 | 2 | 1.5040 | 1.038 |
| myristyl bromide | do | myristyl 2,4 dichlorophenyl ether | 33–34 | | | | |
| cetyl bromide | do | cetyl 2,4 dichlorophenyl ether | 37–39 | | | | |
| octadecyl bromide | do | octadecyl 2,4 dichlorophenyl ether | 46–47 | | | | |
| cetyl bromide | 2,4,5 trichlorophenol | cetyl 2,4,5 trichlorophenyl ether | 56–59 | | | | |
| lauryl bromide | 4 fluorophenol | lauryl 4 fluorophenyl ether | | 175 | 5 | 1.4713 | 0.915 |
| myristyl bromide | do | myristyl 4 fluorophenyl ether | 32–33 | | | | |
| cetyl bromide | do | cetyl 4 fluorophenyl ether | 38–38.5 | | | | |
| lauryl bromide | 2,4 difluorophenol | lauryl 2,4 difluorophenyl ether | | 160 | 4 | 1.4650 | 0.915 |
| myristyl bromide | do | myristyl 2,4 difluorophenyl ether | | 153–155 | 1 | 1.4647 | |
| cetyl bromide | do | cetyl 2,4 difluorophenyl ether | 32–33 | | | | |
| lauryl bromide | 2 methyl 4 fluorophenol | lauryl 2 methyl 4 fluorophenyl ether | | 192 | 7 | 1.4729 | 0.911 |
| myristyl bromide | do | myristyl 2 methyl 4 fluorophenyl ether | 25–26 | | | | |
| cetyl bromide | do | cetyl 2 methyl 4 fluorophenyl ether | 34–36 | | | | |

While we have described our compounds, their properties and their use in considerable detail, it will be understood that a number of variations are possible. We therefore desire our invention to be limited solely by the scope of the appended claims.

We claim:

1. A chemical compound possessing biological activity selected from the group consisting of: alkyl ethers of 2,4-dichlorophenol having an even number of carbon atoms in the range 8 to 18 in a straight chain in the alkyl group; the n-hexadecyl ether of 2,4,5-trichlorophenol, the n-dodecyl, n-tetradecyl and n-hexadecyl ethers of 4-fluorophenol, the n-dodecyl, n-tetradecyl and n-hexadecyl ethers of 2,4-difluorophenol and the n-dodecyl, n-tetradecyl and n-hexadecyl ethers of 2-methyl-4-fluorophenol.

2. An alkyl ether of 2,4-dichlorophenol having in the alkyl group an even number of carbon atoms in the range of 8 to 18 in a straight chain.

References Cited in the file of this patent

UNITED STATES PATENTS

| | | |
| --- | --- | --- |
| 2,054,509 | Pastac | Sept. 15, 1936 |
| 2,137,784 | Prutton et al. | Nov. 22, 1938 |
| 2,188,734 | Carswell | Jan. 30, 1940 |
| 2,327,338 | Carswell | Aug. 24, 1943 |
| 2,581,972 | Rottschaefer | Jan. 8, 1952 |
| 2,594,935 | Ladd et al. | Apr. 29, 1952 |

OTHER REFERENCES

Jones: Journal, Chemical Society (London), 1935, pp. 1831–5.

McLane et al.: Weeds, vol. II, October 1953, No. 4, pp. 288–291.